United States Patent
Lin et al.

(10) Patent No.: US 8,027,398 B2
(45) Date of Patent: Sep. 27, 2011

(54) METHOD FOR SOLVING HIGH PAPR PROBLEM OF MCM COMMUNICATION SYSTEM USING UNITARY TRANSFORM

(75) Inventors: Mao-Chao Lin, Taipei (TW);
Shang-Kang Deng, Taipei (TW);
Tien-Hui Chen, Changhua (TW);
Yu-Hung Lo, Sijhih (TW)

(73) Assignee: National Taiwan University, Taipei (TW)

( * ) Notice: Subject to any disclaimer, the term of this patent is extended or adjusted under 35 U.S.C. 154(b) by 632 days.

(21) Appl. No.: 12/142,462

(22) Filed: Jun. 19, 2008

(65) Prior Publication Data

US 2009/0147870 A1    Jun. 11, 2009

(30) Foreign Application Priority Data

Dec. 10, 2007    (TW) .............................. 96147011 A

(51) Int. Cl.
*H04K 1/10*    (2006.01)
*H04L 27/28*    (2006.01)
*H04L 25/00*    (2006.01)
(52) U.S. Cl. ........................................ 375/260; 375/259
(58) Field of Classification Search .................... 375/260
See application file for complete search history.

(56) References Cited

U.S. PATENT DOCUMENTS

2006/0245346 A1*  11/2006  Bar-Ness et al. ............. 370/203

OTHER PUBLICATIONS

Breiling et al., "SLM Peak-Power Reduction Without Explicit Side Information", IEEE Communications Letters, vol. 5, No. 6, Jun. 2001; pp. 239-241.
Tan et al., "STBC MIMO_OFDM Peak-to-Average Power Ration Reduction by Cross-Antenna Rotation and Inversion", IEEE Communication Letters, vol. 9, No. 7, Jul. 2005; pp. 592-594.
Lee et al., "Peak Power Reduction Using a Unitary Rotation in Multiple Transmit Antennas", pp. 2407-2411, 2005 IEEE.
Bauml et al., "Reducing the peak-to-average power ration of multicarrier modulation by selected mapping", Electronics Letters, Oct. 24, 1996, vol. 32 No. 22; pp. 2056-2057.

* cited by examiner

*Primary Examiner* — Dac Ha
*Assistant Examiner* — Erin File
(74) *Attorney, Agent, or Firm* — Birch, Stewart, Kolasch & Birch, LLP

(57) ABSTRACT

The method contains the following steps. First, in a MCM system with N sub-carriers, the baseband signal blocks $\bar{X}_j$, j=1, 2, ..., B are supplemented with zeros and processed with LN-point IFFT, respectively, to obtain L-time oversampled time-domain signal blocks $\bar{x}_j$, j=1,2,...,B. Then, $\bar{x}_j$ undergoes Q Time Domain Circular Shifts or Frequency Domain Circular Shifts to obtain Q signal blocks $\tilde{x}_j^{(i_j)}$, $i_j=1, \Lambda, Q$. Subsequently, a B×B unitary transform is performed against $(\bar{x}_1, \tilde{x}_2^{(i_2)}, \ldots, \tilde{x}_B^{(i_B)})$. After the unitary transform, for each $(i_2, \ldots, i_B)$ a combination having B time-domain signal blocks is obtained as follows: $(\tilde{y}_1^{(i_2,\ldots,i_B)}, \tilde{y}_2^{(i_2,\ldots,i_B)}, \ldots, \tilde{y}_B^{(i_2,\ldots,i_B)}) = (\bar{x}_1, \tilde{x}_2^{(i_2)}, \ldots, \tilde{x}_B^{(i_B)}) cU$ where U is the B×B unitary matrix, and c is an arbitrary constant (c≠0). Finally, the total $Q^{B-1}$ combinations are compared against each other to select a best candidate for transmission that could produce the lowest peak value, or the smallest PAPR, or the lowest clipping noise power.

7 Claims, 5 Drawing Sheets

METHOD FOR SOLVING HIGH PAPR PROBLEM OF MCM COMMUNICATION SYSTEM USING UNITARY TRANSFORM

BACKKGROUND OF THE INVENTION

1. Field of the Invention

The present invention generally relates to multicarrier modulation systems, and more particularly to a method for solving the high peak-to-average power ratio problem of multicarrier modulation system.

2. The Related Arts

Multicarrier modulation (MCM) systems, such as those adopting orthogonal frequency division multiplexing (OFDM) modulation/demodulation techniques, have been widely applied in digital subscriber loop (DSL), digital video broadcasting (DVB), digital audio broadcasting (DAB), and wireless local area network (WLAN), due to their high spectral efficiency, better immunity to multi-path fading, easier equalization to frequency-selective fading channels.

However, in contrast to single-carrier modulation systems, MCM systems have an inherent disadvantage. That is, the time-domain signal of a MCM system usually suffer high peak-to-average power ratio (PAPR). In a MCM system, as various data are transmitted simultaneously over various sub-carriers, the total effect of these sub-carriers would result in a time-domain signal and a high PAPR where the peak value is significantly greater than the average value. Due to the high PAPR, the power amplifier of a MCM system's transmitter has to be designed with an enlarged linear region. However, the design of such a power amplifier is not an easy task. On the other hand, if a power amplifier of limited linear region is adopted in the MCM system's transmitter, the power amplifier would sometimes operate in the non-linear region (i.e., under saturation). This mode of operation would inevitably cause non-linear distortion.

Therefore, quite a few methods have been disclosed in reducing a MCM system's PAPR. Among them, selective mapping (SLM) is a quite popular approach (please see R. W. Bauml, R. F. H. Fischer, J. B. Huber, "Reducing the peak-to-average power ratio of multicarrier modulation by selected mapping, "Electronic Letters, vol. 32, pp. 2056-2057, 1996, and M. Breiling, S. H. Müller-Weinfurtner, and J. B. Huber, "SLM peak-power reduction without explicit side information," IEEE Communications Letters, vol. 5, no. 6, pp. 239-241, June 2001). The basic idea behind SLM is that, when multiple modulation signals have the same phase, a high time-domain peak value would be resulted. Therefore, by adjusting some of the modulation signals' phases, the peak value could be reduced. A conventional approach using SLM is shown in FIG. 1 which produces Q candidates. Then, a best candidate such as one that could produce the lowest PAPR is selected. As illustrated, the conventional method requires Q inverse fast Fourier transforms (IFFTs) and each IFFT requires highly complicated computation. In addition, a high Q value is required to effectively reduce the PAPR. These all contribute to the implementation complexity of SLM.

Accordingly, there are teachings using unitary transforms to produce multiple candidates for the reduction of PAPR (please see Heechoon Lee, Daniel N. Liu, Weijun Zhu and Michael P. Fitz, "Peak Power Reduction Using a Unitary Rotation in Multiple Transmit Antennas" 2005 IEEE International Conference on Communications, Seoul, Korea, May 16-20, 2005). However, the unitary transform matrices U still requires rather significant computation and therefore still has substantial implementation difficulty, where $$U = \begin{pmatrix} r & \sqrt{1-r^2}\, e^{j\theta} \\ \sqrt{1-r^2}\, e^{-j\theta} & -r \end{pmatrix}, 0 \le r \le 1, 0 \le \theta \le 2\pi$$

BRIEF SUMMARY OF THE INVENTION

Accordingly, the present invention provides a novel method to solve the high PAPR problem of MCM systems.

The method contains the following steps. First, in a MCM system with N sub-carriers, the baseband signal blocks $\overline{X}_j$, $j=1, 2, \ldots, B$ are supplemented with zeros and processed with LN-point IFFT, respectively, to obtain L-time oversampled time-domain signal blocks $\overline{x}_j$, $j=1,2,\ldots,B$. Then, $\overline{x}_j$ undergoes Q Time Domain Circular Shifts or Frequency Domain Circular Shifts to obtain Q signal blocks $\tilde{x}_j^{(i_j)}$, $i_j=1, \Lambda, Q$. Subsequently, a B×B unitary transform is performed against $(\overline{x}_1, \tilde{x}_2^{(i_2)}, \ldots, \tilde{x}_B^{(i_B)})$. After the unitary transform, for each $(i_2, \ldots, i_B)$, a combination having B time-domain signal blocks is obtained as follows: $(\tilde{y}_1^{(i_2, \ldots, i_B)}, \tilde{y}_2^{(i_2, \ldots, i_B)}, \ldots, \tilde{y}_B^{(i_2, \ldots, i_B)}) = (\overline{x}_1, \tilde{x}_2^{(i_2)}, \ldots, \tilde{x}_B^{(i_B)}) cU$ where U is the B×B unitary matrix, and c is an arbitrary constant ($c \ne 0$). Finally, the total $Q^{B-1}$ combinations are compared against each other to select a best candidate for transmission that could produce the lowest peak value, or the smallest PAPR, or the lowest clipping noise power.

The method adopts the concept of SLM but avoids the conventional SLM's drawback of using a large number of IFFTs. The method therefore has a significantly less complexity in effectively reducing the PAPR or the clipping noise power resulted from a high PAPR of a MCM system without sacrificing error rate.

The foregoing and other objects, features, aspects and advantages of the present invention will become better understood from a careful reading of a detailed description provided herein below with appropriate reference to the accompanying drawings.

DETAILED DESCRIPTION OF THE INVENTION

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
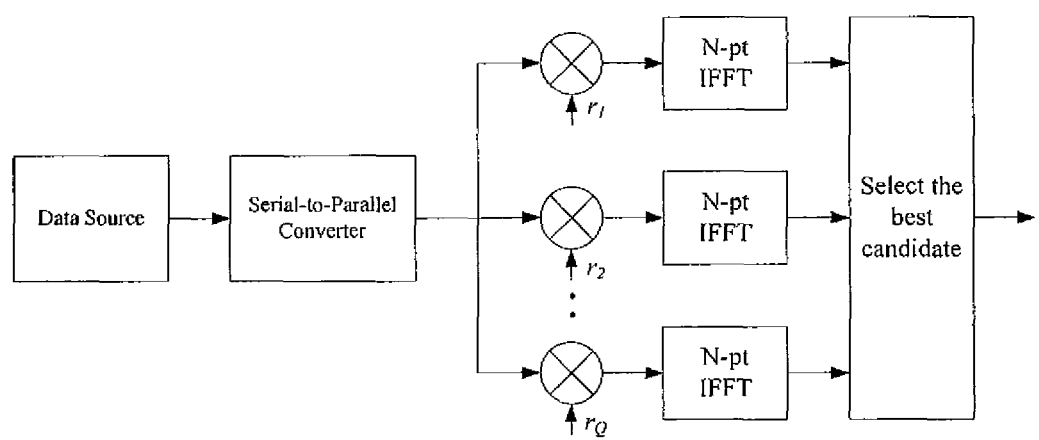
FIG. 1 is a schematic structure diagram of a system using a conventional SLM.
Figure 2:
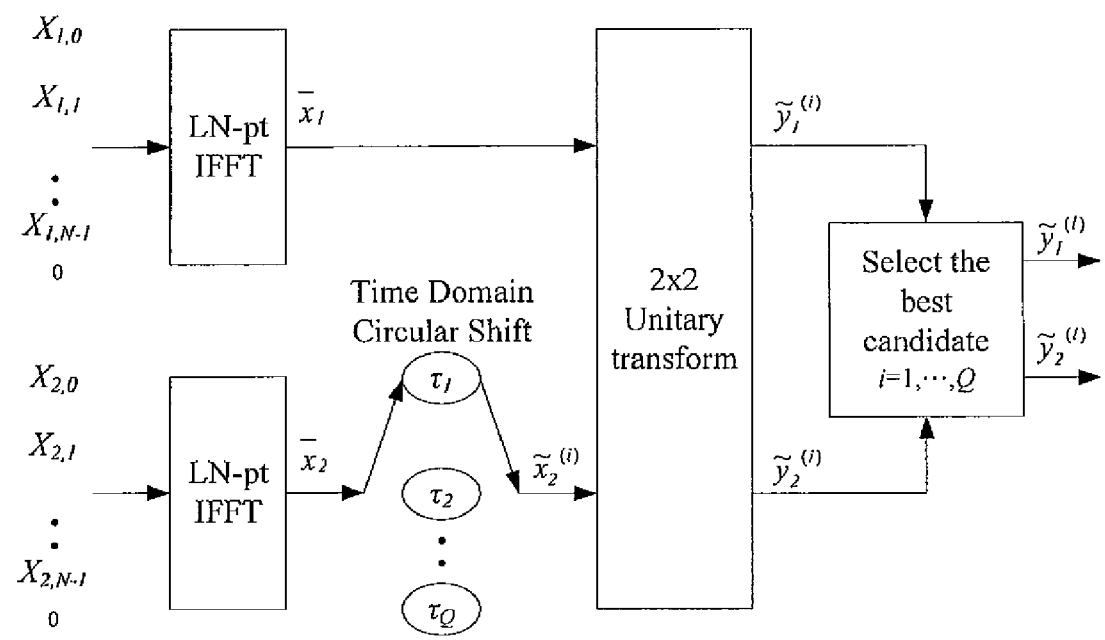
FIG. 2 is a schematic structure diagram of a system using a first embodiment of the present invention.

FIG. 2 is a schematic diagram showing a first embodiment of the present invention, which performs 2×2 unitary transforms for a MCM system having N (N≧2) sub-carriers.

First in step 1, in order to achieve more accurate estimation of the PAPR, the present embodiment supplements (L−1)N zeros (L≧1) to the baseband signal blocks $\overline{X_1}=(X_{1,0}, X_{1,1}, \ldots, X_{1,N-1})$ and $\overline{X_2}=(X_{2,0}, X_{2,1}, \ldots, X_{2,N-1})$ generated from the MCM system with N sub-carriers, respectively, so that $\overline{X_1}$ and $\overline{X_2}$ become $(X_{1,0}, X_{1,1}, \ldots, X_{1,N-1}, 0, \ldots, 0)$ and $(X_{2,0}, X_{2,1}, \ldots, X_{2,N-1}, 0, \ldots, 0)$.

The baseband signal blocks $\overline{X_1}$ and $\overline{X_2}$ then undergo LN-point IFFT (denoted as "LN-pt IFFT" in the drawing), respectively, to obtain L-time oversampled time-domain signal blocks $\overline{x_1}=(x_{1,0}, x_{1,1}, \ldots, x_{1,LN-1})$ and $\overline{x_2}=(x_{2,0}, x_{2,1}, \ldots, x_{2,LN-1})$.

Subsequently, in step 2, $\overline{x_2}$ undergoes Q (Q≧1) different Time Domain Circular Shift with parameters $\tau_1, \tau_2, \ldots, \tau_Q$ (all greater than zero) to obtain $\tilde{x}_2^{(i)}=TS(\overline{x}_2, \tau_i)=(a_{2,1}^{(i)}, a_{2,2}^{(i)}, \ldots, a_{2,n}^{(i)})$, i=1, ..., Q. The Time Domain Circular Shift operation $TS(\overline{x}_2, \tau_i)$ is to shift the time-domain signal block $\overline{x_2}$ left for $\tau_i$ ($\tau_i$ is any integer) time points or more specifically, $$a_{2,n}^{(i)}=x_{2,[(n-\tau_i)mod(LN)]}, n=0, 1, \ldots, (LN-1)$$

where "mod" is the standard modulo operation.

Then in step 3, for each i, a 2×2 unitary transform is performed against $(\overline{x_1}, \tilde{x}_2^{(i)})$. Please note that a characteristic of the unitary transform is that the energy of a signal block before and after the unitary transform remains unchanged. After the unitary transforms, for each i, a combination having two time-domain signal blocks $(\tilde{y}_1^{(i)}, \tilde{y}_2^{(i)})$ is obtained. In other words, $$(\tilde{y}_1^{(i)}, \tilde{y}_2^{(i)})=(\overline{x_1}, \tilde{x}_2^{(i)})U$$

where U is the 2×2 unitary matrix. To reduce computational complexity, the following unitary matrix U could be adopted:

$$U = \begin{pmatrix} 1/\sqrt{2} & 1/\sqrt{2} \\ 1/\sqrt{2} & -1/\sqrt{2} \end{pmatrix}$$

In implementation, it is also possible to adopt $(\tilde{y}_1^{(i)}, \tilde{y}_2^{(i)})=(\overline{x_1}, \tilde{x}_2^{(i)})cU$, where c is an arbitrary constant (c≠0). Therefore, if $$cU = \begin{pmatrix} 1 & 1 \\ 1 & -1 \end{pmatrix},$$

multiplication could be avoided and the computational complexity is extremely low.

Finally, in step 4, all Q combinations $(\tilde{y}_1^{(1)}, \tilde{y}_2^{(1)})$, $(\tilde{y}_1^{(2)}, \tilde{y}_2^{(2)})$, ..., and $(\tilde{y}_1^{(Q)}, \tilde{y}_2^{(Q)})$ are compared against each other and a best combination $(\tilde{y}_1^{(I)}, \tilde{y}_2^{(I)})$ is selected for transmission.

The condition for deciding the best combination could be that $(\tilde{y}_1^{(I)}, \tilde{y}_2^{(I)})$ produces the lowest peak value, or $(\tilde{y}_1^{(I)}, \tilde{y}_2^{(I)})$ produces the smallest PAPR. The two selection criteria would sometimes produce different results. If the condition is the lowest peak value, the IFFT of L-time oversampling used should have the L value at least 4 so that the L-time oversampling result would closely approximate the PAPR of continuous-time signal.

In addition, the condition could also be that $(\tilde{y}_1^{(I)}, \tilde{y}_2^{(I)})$ produces the lowest clipping noise power. The so-called clipping refers to the following function that turns an input signal x into an output signal g(x):

$$x = pe^{j\Phi}, p = |x|$$
$$g(x) = \begin{cases} x, & \text{for } p \leq A \\ Ae^{j\Phi}, & \text{for } p > A \end{cases}$$

Using the time-domain signal block $\overline{x}=(x_0, x_1, \ldots, LN-1)$ as example, its clipping noise power would be $$\sum_{i=0}^{LN-1} |x_i - g(x_i)|^2.$$

The A value could be adjusted in accordance with power backoff and it is related to the multiple L in oversampling and number of sub-carriers N.

When the lowest clipping noise power is the condition for selection, there is not much difference between the produced clipping noise using L=1, 2, or 4. As such, implementation could adopt an IFFT using the Nyquist Rate (i.e., L=1) which could further reduce the implementation complexity.

Figure 3:
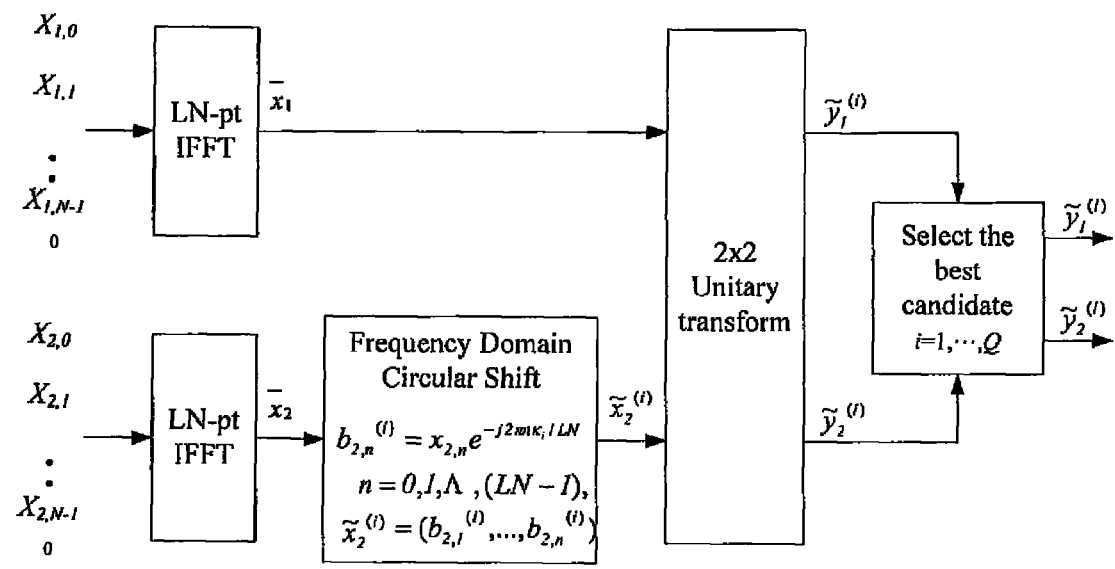
FIG. 3 is a schematic structure diagram of a system using a second embodiment of the present invention.

FIG. 3 is a schematic diagram showing a second embodiment of the present invention, which performs circular shift in the frequency domain in contrast to the circular shift in the time domain performed by the previous embodiment.

Step 1 is identical to the previous embodiment and (L−1)N zeros (L≧1) are supplemented to the baseband signal blocks $\overline{X_1}=(X_{1,0}, X_{1,1}, \ldots, X_{1,N-1})$ and $\overline{X_2}=(X_{2,0}, X_{2,1}, \ldots, X_{2,N-1})$ generated from the MCM system with N sub-carriers, respectively, so that $\overline{X_1}$ and $\overline{X_2}$ become $(X_{1,0}, X_{1,1}, \ldots, X_{1,N-1}, 0, \ldots, 0)$ and $(X_{2,0}, X_{2,1}, \ldots, X_{2,N-1}, 0, \ldots, 0)$. The baseband signal blocks $\overline{X_1}$ and $\overline{X_2}$ then undergo LN-point IFFT (denoted as "LN-pt IFFT" in the drawing), respectively, to obtain L-time oversampled time-domain signal blocks $\overline{x_1}=(x_{1,0}, x_{1,1}, \ldots, x_{1,LN-1})$ and $\overline{x_2}=(x_{2,0}, x_{2,1}, \ldots, x_{2,LN-1})$.

Then, in step 2, $\overline{x_2}$ is processed by the following function for Q times sequentially:

$$b_{2,n}^{(i)}=x_{2,n}e^{-j2\pi o\kappa_i n/LN}, n=0, 1, \Lambda, (LN-1), i=1, \ldots, Q$$

The function is equivalent to subjecting frequency-domain signal block $(X_{2,0}, X_{2,1}, \ldots, X_{2,N-1}, 0, \ldots, 0)$ to Q different Frequency Domain Circuit Shift to obtain time-domain signals:

$$\tilde{x}_2^{(i)}=FS((X_{2,0}, X_{2,1}, \ldots, X_{2,N-1}, 0, \ldots, 0), \kappa_i)=(b_{2,1}^{(i)}, b_{2,2}^{(i)}, \ldots, b_{2,n}^{(i)}), i=1, \Lambda, Q$$

In other words, $FS((X_{2,0}, X_{2,1}, \ldots, X_{2,N-1}, 0, \ldots, 0), \kappa_i)$ is the corresponding time-domain signal block after shifting the frequency-domain signal block $(X_{2,0}, X_{2,1}, \ldots, X_{2,N-1}, 0, \ldots, 0)$ to the left $\kappa_i$ ($\kappa_i$ is an arbitrary integer) frequency units.

Subsequently, in step 3, for each i, the 2×2 unitary transform identical to that used in the previous embodiment is performed against $(\overline{x_1}, \tilde{x}_2^{(i)})$. After the unitary transforms, for each i, a combination having two time-domain signal blocks $(\tilde{y}_1^{(i)}, \tilde{y}_2^{(i)})$ is obtained.

Finally, in step 4, all Q combinations $(\tilde{y}_1^{(1)}, \tilde{y}_2^{(1)})$, $(\tilde{y}_1^{(2)}, \tilde{y}_2^{(2)})$, ..., and $(\tilde{y}_1^{(Q)}, \tilde{y}_2^{(Q)})$ are compared against each other and a best combination $(\tilde{y}_1^{(1)}, \tilde{y}_2^{(1)})$ is selected for transmission. The condition for deciding the best combination, identical to the previous embodiment, could be that $(\tilde{y}_1^{(1)}, \tilde{y}_2^{(1)})$ produces the lowest peak value, or $(\tilde{y}_1^{(1)}, \tilde{y}_2^{(1)})$ produces the smallest PAPR, or $(\tilde{y}_1^{(1)}, \tilde{y}_2^{(1)})$ produces the lowest clipping noise power.

Compared to Time Domain Circular Shift, the Frequency Domain Circular Shift is more complex in that calculating $b_{2,n}^{(i)} = x_{2,n} e^{-j2\pi n \kappa_i/LN}$ from $x_{2,n}$ requires more computation than caculating $a_{2,n}^{(i)} = x_{2,[(n-\tau_i) mod(LN)]}$ from $x_{2,n}$. In addition, when the oversampling factor L is greater than 1, using Frequency Domain Circular Shift would also result in the out-of-band spectrum.

In the following, the present invention is extended from processing two multicarrier modulation signal blocks to processing B (B≧2) signal blocks. For simplicity, the embodiments presented use Time Domain Circular Shift only as they could be easily extended to cover Frequency Domain Circular Shift cases following the foregoing description.

Figure 4:
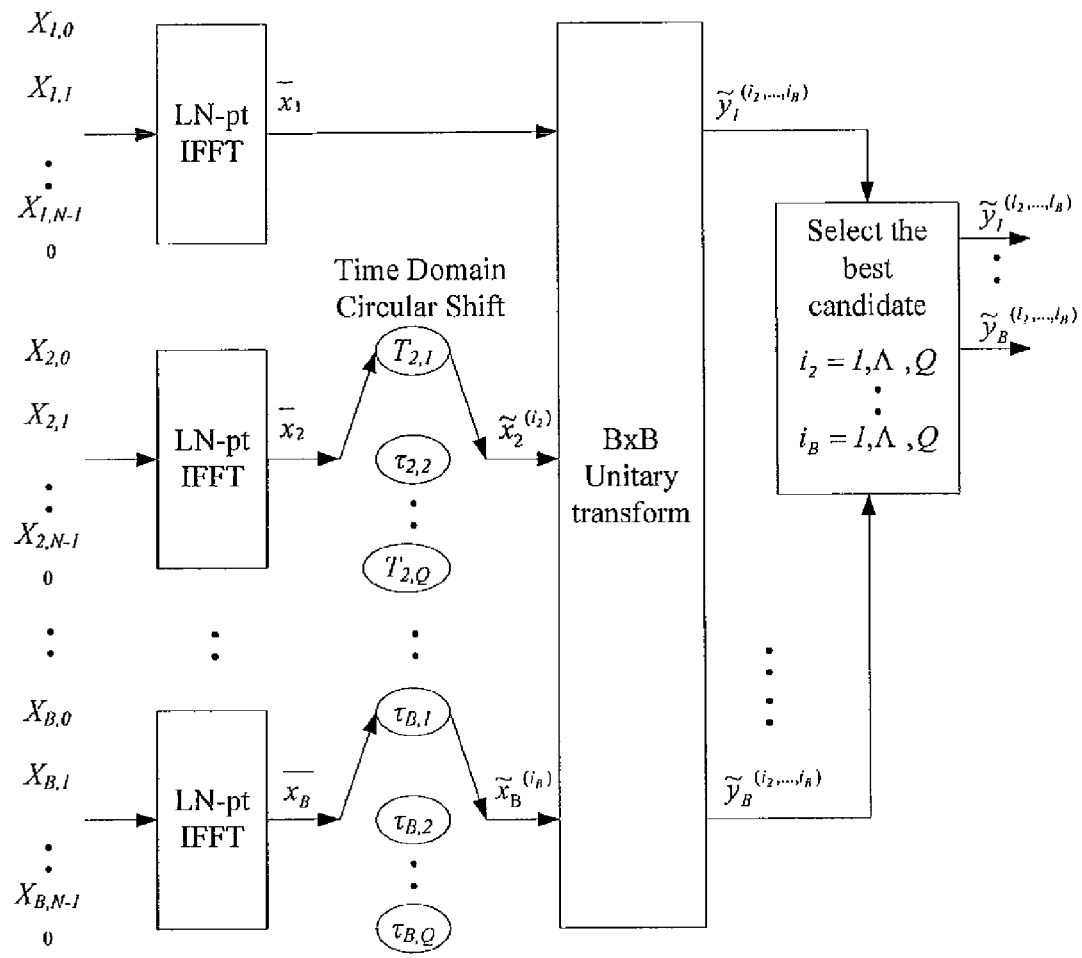
FIG. 4 is a schematic structure diagram of a system using a third embodiment of the present invention.

As illustrated in FIG. 4, in step 1, B baseband signal blocks $\overline{X}_1 = (X_{1,0}, X_{1,1}, \ldots, X_{1,N-1})$, $\overline{X}_2 = (X_{2,0}, X_{2,1}, \ldots, X_{2,N-1})$, ..., $\overline{X}_B = (X_{B,0}, X_{B,1}, \ldots, X_{B,N-1})$ generated from the MCM system with N sub-carriers are supplemented with zeros and processed with LN-point IFFT, respectively, to obtain L-time oversampled time-domain signal blocks $\overline{x}_1 = (x_{1,0}, x_{1,1}, \ldots, x_{1,LN-1})$, $\overline{x}_2 = (x_{2,0}, x_{2,1}, \ldots, x_{2,LN-1})$, ..., $\overline{x}_B = (x_{B,0}, x_{B,1}, \ldots, x_{B,LN-1})$.

Then, in step 2, $\overline{x}_j$ undergoes Q Time Domain Circular Shifts with parameters $\tau_{j,1}, \tau_{j,2}, \ldots, \tau_{j,Q}$ to obtain $\tilde{x}_j^{(i)} = TS(\overline{x}_j, \tau_{j,1})$, i=1, Λ, Q, j=2, Λ, B.

Subsequently, in step 3, a B×B unitary transform is performed against $(\overline{x}_1, \tilde{x}_2^{(i_2)}, \ldots, \tilde{x}_B^{(i_B)})$. After the unitary transform, for each $(i_2, \ldots, i_B)$, a combination having B time-domain signal blocks is obtained as follows:

$$(\tilde{y}_1^{(i_2, \ldots, i_B)}, \tilde{y}_2^{(i_2, \ldots, i_B)}, \ldots, \tilde{y}_B^{(i_2, \ldots, i_B)}) = (\overline{x}_1, \tilde{x}_2^{(i_2)}, \ldots, \tilde{x}_B^{(i_B)}) c U$$

where U is the B×B unitary matrix, and c is an arbitrary constant (c≠0).

Finally, in step 4, for all $(i_2, \ldots, i_B)$ combinations, the combinations $(\tilde{y}_1^{(i_2, \ldots, i_B)}, \tilde{y}_2^{(i_2, \ldots, i_B)}, \ldots, \tilde{y}_B^{(i_2, \ldots, i_B)})$, $i_2=1, \Lambda, Q, \ldots, i_B=1, \Lambda, Q$ are compared against each other to select a best combination $(\tilde{y}_1^{(i_2, \ldots, i_B)}, \tilde{y}_2^{(i_2, \ldots, i_B)}, \ldots, \tilde{y}_B^{(i_2, \ldots, i_B)})$ for transmission. The condition for deciding the best combination, identical to the previous embodiments, could be the combination that produces the lowest peak value, or the smallest PAPR, or the lowest clipping noise power.

The foregoing embodiments all perform a single unitary transform. In the following, the present invention is extended to cover embodiments performing P unitary transforms (P≧1).

In step 1, B baseband signal blocks $\overline{X}_1 = (X_{1,0}, X_{1,1}, \ldots, X_{1,N-1})$, $\overline{X}_2 = (X_{2,0}, X_{2,1}, \ldots, X_{2,N-1})$, ..., $\overline{X}_B = (X_{B,0}, X_{B,1}, \ldots, X_{B,N-1})$ are supplemented with zeros are processed with LN-point IFFT, respectively, to obtain L-time oversampled time-domain signal blocks $\overline{x}_1 = (x_{1,0}, x_{1,1}, \ldots, x_{1,LN-1})$, $\overline{x}_2 = (x_{2,0}, x_{2,1}, \ldots, x_{2,LN-1})$, ..., $\overline{x}_B = (x_{B,0}, x_{B,1}, \ldots, x_{B,LN-1})$.

Then, in step 2, $\overline{x}_j$ undergoes Q Time Domain Circular Shifts with parameters $\tau_{j,1}, \tau_{j,2}, \ldots, \tau_{j,Q}$ to obtain $\tilde{x}_j^{(i)} = TS(\overline{x}_j, \tau_{j,i})$, i=1, Λ, Q, j=2, Λ, B.

Subsequently, in step 3, P B×B unitary transforms are performed against $(\overline{x}_1, \tilde{x}_2^{(i_2)}, \ldots, \tilde{x}_B^{(i_B)})$. After the pth unitary transforms, p=1, 2, ..., P, for each $(i_2, \ldots, i_B)$, a combination having B time-domain signal blocks is obtained as follows:

$$(\tilde{y}_1^{(i_2, \ldots, i_B)}, \tilde{y}_2^{(i_2, \ldots, i_B)}, \ldots, \tilde{y}_B^{(i_2, \ldots, i_B)}) = (\overline{x}_1, \tilde{x}_2^{(i_2)}, \ldots, \tilde{x}_B^{(i_B)}) c U_p$$

where $U_p$ is the B×B unitary matrix, and c is an arbitrary constant (c≠0).

Finally, in step 4, for all $(i_2, \ldots, i_B)$ combinations (there are total $PQ^{B-1}$ combinations), the combinations $(\tilde{y}_1^{(i_2, \ldots, i_B, p)}, \tilde{y}_2^{(i_2, \ldots, i_B, p)}, \ldots, \tilde{y}_B^{(i_2, \ldots, i_B, p)})$, $i_2=1, \Lambda, Q, \ldots, i_B=1, \Lambda, Q, p=1, \ldots, P$ are compared against each other to select a best combination for transmission. The condition for deciding the best combination, identical to the previous embodiments, could be the combination that produces the lowest peak value, or the smallest PAPR, or the lowest clipping noise power.

In the following, the performances of the present invention and a SLM called SS-CARI (Successive Suboptimal CARI) (please see Z. M. Tan and Y. Bar-Ness, "STBC MIMO-OFDM Peak Power Reduction by Cross-antenna Rotation and Inversion," IEEE Commun. Lett., vol. 9, pp. 592, July 2005) are compared as they are used in a two-input and two-output (2×2) QPSK OFDM MCM (MIMO-OFDM) system with 128 sub-carriers.

When reducing PAPR using SS-CARI, if the number of candidates is 8 or 16, correspondingly 16 or 32 IFFTs have to be conducted. In contrast, only two IFFTs are required for the present invention, whether the number of circular shifts is 8 or 16 (i.e., Q=8 or 16 so as to produce 8 or 16 candidates).

Figure 5:
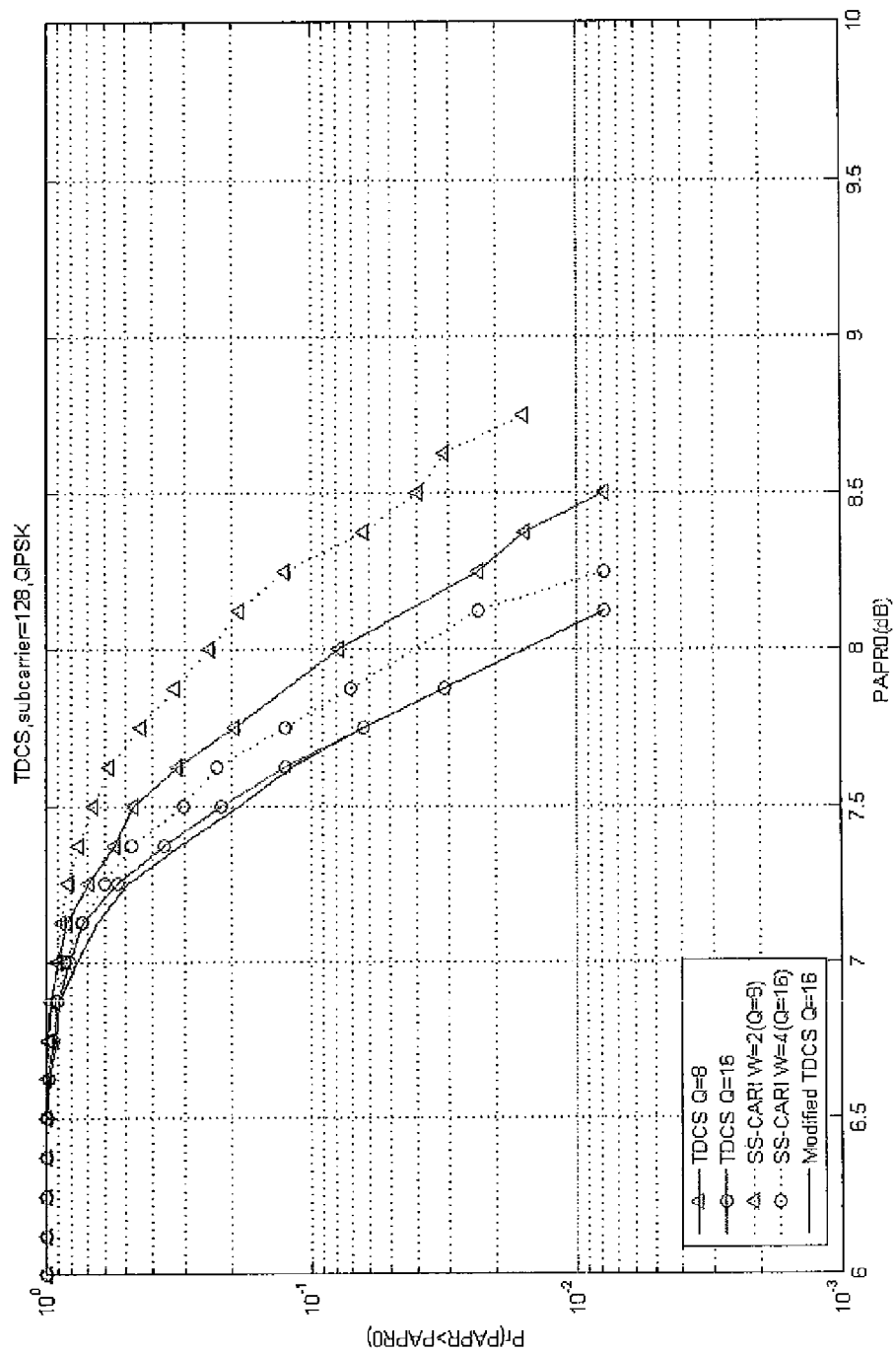
FIG. 5 shows the simulation results of Complementary Cumulative Distribution Function (CCDF) of systems using SS-CARI and the present invention, respectively.

Simulation results for the foregoing system's Complementary Cumulative Distribution Function (CCDF) using SS-CARI and the present invention are shown in the graph of FIG. 5 where the curves marked as TDCS are those using Time Domain Circular Shift. As illustrated, whether the number of candidates is 8 or 16, the present invention has lower CCDF compared to SS-CARI. In other words, the present invention indeed could effectively reduce the PAPR with significantly less complexity. Also from simulation data, the present invention has an error rate comparable to that of SS-CARI. The present invention therefore does not achieve the reduction of PAPR at the cost of the system's error rate.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for solving high peak-to-average power ratio (PAPR) problem of a multicarrier modulation (MCM) system with N sub-carriers, comprising the steps of:
   supplementing baseband signal blocks $\overline{X}_j = (X_{j,0}, X_{j,1}, \ldots, X_{j,N-1})$, j=1, 2, ..., B generated from the MCM system with (L−1)N zeros and processing $\overline{X}_j = (X_{j,0}, X_{j,1}, \ldots, X_{j,N-1}, 0, \ldots, 0)$ with LN-point IFFT to obtain L-time oversampled time-domain signal blocks $\overline{x}_j = (x_{j,0}, x_{j,1}, \ldots, x_{j, LN-1})$, respectively;
   performing a circular shift operation on $\overline{x}_j$ to obtain Q signal blocks $\tilde{x}_j^{(i_j)}$, i_j=1, ..., Q;
   for $(\overline{x}_1, \tilde{x}_2^{(i_2)}, \ldots, \tilde{x}_B^{(i_B)})$, i_2=1, ..., Q, ..., i_B=1, ..., Q, performing P B×B unitary transform using matrixes Up, p=1, ..., P to obtain, for each $(i_2, \ldots, i_B, p)$ combination, a combination containing B time-domain signal blocks $(\tilde{y}_1^{(i_2, \ldots, i_B, p)}, \tilde{y}_2^{(i_2, \ldots, i_B, p)}, \ldots, \tilde{y}_B^{(i_2, \ldots, i_B, p)}) = (\overline{x_1}, \tilde{x}_2^{(i_2)}, \ldots, \tilde{x}_B^{(i_B)}) cU_p$ where c is an arbitrary constant ($c \neq 0$); and for all $PQ^{B-1}$ combinations, comparing said combinations $(\tilde{y}_1^{(i_2, \ldots, i_B, p)}, \tilde{y}_2^{(i_2, \ldots, i_B, p)}, \ldots, \tilde{y}_B^{(i_2, \ldots, i_B, p)})$, $i_2=1,\ldots,Q,\ldots,i_B=1,\ldots,Q, p=1,\ldots,P$ to select a best combination $(\tilde{y}_1^{(i_2, \ldots, i_B, p)}, \tilde{y}_2^{(i_2, \ldots, i_B, p)}, \ldots, \tilde{y}_B^{(i_2, \ldots, i_B, p)})$ for transmission.

2. The method according to claim 1, wherein said best combination $(\tilde{y}_1^{(i_2, \ldots, i_B)}, \tilde{y}_2^{(i_2, \ldots, i_B)}, \ldots, \tilde{y}_B^{(i_2, \ldots, i_B)})$ achieves the lowest peak value.

3. The method according to claim 1, wherein said best combination $(\tilde{y}_1^{(i_2, \ldots, i_B)}, \tilde{y}_2^{(i_2, \ldots, i_B)}, \ldots, \tilde{y}_B^{(i_2, \ldots, i_B)})$ achieves the smallest PAPR.

4. The method according to claim 1, wherein said best combination $(\tilde{y}_1^{(i_2, \ldots, i_B)}, \tilde{y}_2^{(i_2, \ldots, i_B)}, \ldots, \tilde{y}_B^{(i_2, \ldots, i_B)})$ achieves the lowest clipping noise power.

5. The method according to claim 1, wherein L=1.

6. The method according to claim 1, wherein said circular shift operation is to shift $\overline{x}_j$ to the left for $\tau_{i_j}$ time points to obtain time-domain signal block $\tilde{x}_j^{(i_j)}$, $i_j=1, \ldots, Q$ as follows:

$$\tilde{x}_j^{(ij)} = (a_{j,0}^{(ij)}, a_{j,1}^{(ij)}, \ldots, a_{j,LN-1}^{(ij)}); \text{ and}$$

$$a_{j,n}^{(ij)} = x_{j,[(n-\tau_{ij}) mod (LN)]}, n=0,1,\ldots,(LN-1), i_j=1,\ldots,Q, j=2,\ldots,B.$$

7. The method according to claim 1, wherein said circular shift operation is to shift $\overline{x}_j$'s frequency-domain signal block $(X_{j,0}, X_{j,1}, \ldots, X_{j,N-1}, 0, \ldots, 0)$ to the left for $\kappa_{i_j}$ frequency units to obtain corresponding time-domain signal block $\tilde{x}_j^{(ij)}$ as follows:

$$\tilde{x}_j^{(ij)} = (b_{j,0}^{(ij)}, b_{j,1}^{(ij)}, \ldots, b_{j,LN-1}^{(ij)}); \text{ and}$$

$$b_{j,n}^{(ij)} = x_{j,n} e^{-j2\pi n \kappa_{ij}/LN}, n=0,1,\ldots,(LN-1), i_j=1,\ldots,Q, j=2,\ldots,B.$$

* * * * *